United States Patent [19]

Clark et al.

[11] 4,036,720

[45] July 19, 1977

[54] HYDROGEN ISOTOPE SEPARATION

[75] Inventors: Marion D. Clark, Oxon Hill; Thomas J. Manuccia, Laurel, both of Md.

[73] Assignee: The United States of America as represented by the Secretary of the Navy, Washington, D.C.

[21] Appl. No.: 734,904

[22] Filed: Oct. 22, 1976

[51] Int. Cl.$^2$ .......... B01K 1/00; C01B 1/28; C01B 4/00; C01C 1/02
[52] U.S. Cl. .......... 204/177; 204/164; 423/237; 423/248; 423/359; 423/648 A
[58] Field of Search .......... 204/164, 177; 423/237, 423/248, 259, 648 R, 648 A

[56] References Cited

U.S. PATENT DOCUMENTS

| | | | |
|---|---|---|---|
| 1,489,724 | 4/1924 | Wendt | 204/177 |
| 3,344,052 | 9/1967 | Yeh | 204/177 |
| 3,377,135 | 4/1968 | Kenyon | 423/648 |
| 3,716,622 | 2/1973 | Rae | 4423/248 |
| 3,720,598 | 3/1973 | Thompson | 204/164 |

OTHER PUBLICATIONS

Basov et al., Sov. Phys - JETP, vol. 41, No. 6, pp. 1017–1019, 1976.
Basov et al., JETP Lett., vol. 19, No. 6, pp. 190, 191, Mar. 1974.

*Primary Examiner*—F.C. Edmundson
*Attorney, Agent, or Firm*—R. S. Sciascia; Philip Schneider; Thomas McDonnell

[57] ABSTRACT

A method of separating isotopes of hydrogen which comprises subjecting a mixture of nitrogen and isotopes of hydrogen in a $H_2$—$N_2$ mole ratio from 1:4 to 10:1 to a glow electrical discharge from $10^{-3}$ to $10^{+1}$ eV per reactant molecules at a temperature from 50° K to 200° K and at a pressure of at least 0.3 Torr.

7 Claims, No Drawings

HYDROGEN ISOTOPE SEPARATION

BACKGROUND OF THE INVENTION

The present invention pertains generally to isotope separation and more particularly to non-laser deuterium separation from hydrogen.

Techniques for separating isotopes which utilize a laser have the disadvantage of requiring equipment which is difficult and expensive to maintain. These processes also require large expenditures of energy.

Isotope separations based on classical gas phase or liquid phase chemical reaction or isotope exchange provide small separations per stage at room temperature. The amount of separation can be increased by decreasing the temperature, but unfortunately the total throughput drops significantly as the rate of reaction drops at the lower temperatures.

Recently it has been reported in Basov et al, *Isotope Separation in Chemical Reactions Occurring under Thermodynamic Nonequilibrium Conditions*, In JETP Lett. 19(6) :p. 190–1, March 20, 1974 and in Basov et al, *Kinetics of Nonequilibrium Chemical Reactions and Separation of Isotopes*, In Sov. Phys. -JETP: 41(6):p. 1017–9, 1976, that nitrogen-15 has been separated from air by a low-temperature gas-phase reaction of nitrogen with oxygen. The mechanism invoked by the author to explain the experimental results would limit this technique to only separating nitrogen-15 from nitrogen-14. To date the reported yields cannot be duplicated and the reported mechanism has not been verified.

Presently the most successful non-laser deuterium separation process is a gas-liquid phase reaction wherein hydrogen sulfide passes through water. The deuterium present in water (generally about 0.01%) preferentially replaces hydrogen in the hydrogen sulfide. Since the degree of enrichment is only about 5% per stage, the process requires numerous stages and passes. Consequently, the process requires a large equipment investment and the expenditure of much energy. Further, the process employs the dangerous poison, hydrogen sulfide.

SUMMARY OF THE INVENTION

It is therefore an object of this invention to provide a non-laser method for separating deuterium from hydrogen at the large enrichments typical of laser processes, but with throughputs capable of being scaled into the range of the existing $H_2O—H_2S$ process.

Another object is to provide a deuterium separation process which is economical and environmentally safe.

A further object is to provide a deuterium separation process which has low energy requirements.

These and other objects are achieved by the gas-phase chemical reactions of a mixture of the two hydrogen isotopes with nitrogen under the nonequilibrium conditions present in a low-translational-temperature, glow electrical discharge whereby the lighter hydrogen isotope reacts preferentially with nitrogen when compared to the heavier isotope and consequently the reacted gas mixture which condenses on the walls of the reactor has a greater proportion of the lighter isotope than the original gas mixture whereas the gases exiting the reactor has a greater proportion of the heavier isotope.

DETAILED DESCRIPTION OF THE INVENTION

Although it is not thoroughly understood why the highly nonequilibrium conditions of low-translational-temperature glow discharges produce reaction rates sufficiently high and preferential to permit a practical separation of deuterium from hydrogen, it is hypothesized that the over-all separation is due to the accumulation of the isotope effects present in each of the excitation, transfer of excitation, deactivation, and reaction events occurring between the introduction of the reactants into the reactor and formation of the products. This hypothesis derived in part from the observation of experimental data that the amount of separation is inversely related to the amount of energy input. It is understood that this possible explanation of how the present invention achieves its surprising results is given to better describe the invention and is not meant to limit the specification or the claims to follow to any particular theoretical mechanism.

The glow electrical discharge may be either self-sustained or externally sustained. Externally sustained discharges are those involving the use of an external source which produces ionization in the reactor. The glow discharge may either be pulsed or constant. The duration, repetition, and intensity depend on the amount of reactants, the flow rate of the reactants if the reactor is continuous, the size of the reactor, and the desired temperature range. It is required that the discharge energy expenditure is sufficient to provide $10^{-3}$ to $10^{+1}$ eV per reactant molecule. This range represents the most practical operating range. If the discharge energy is less than $10^{-3}$ eV per reactant molecule, the rate of reaction is too slow and if the energy input much exceeds $10^{+1}$ eV per reactant molecule the hydrogen isotopes react at virtually the same rate. Further, the glow discharge cannot be of such a duration that the reactants are depleted on account of the waste of energy and the possibility of causing the reaction to reverse.

The amount of gases in the reactor should be at least sufficient to provide a uniform glow discharge throughout the reactor. The upper limit for the amount of gases would be determined by whether an electrical discharge occurs. If the discharge is self-sustained, the upper limit would be around 25 Torr. The precise upper limit would be determined by the strength of the discharge, the temperature of the gases, and the amount and type of diluent gas. If the electrical discharge is externally sustained, the upper limit could be the condensation pressure of nitrogen.

The reacting gases may be mixed with a diluent gas, such as a noble gas in order to obtain a more uniform heat distribution throughout the gas mixture. The preferred gases are helium, xenon, and argon. Of course, any gas which conducts heat well, has a large heat capacity and is not reactive may be used.

The reacting gases are reacted in a $H_2—N_2$ mole ratio from 1:4 to 10:1 and preferably from 1:3 to 5:1. If a diluent gas is included, the amount of the gas is at least greater than zero and preferably less than or equal to 70 moles per mole of reacting gases and most preferably, less than or equal to 40 moles per mole of reacting gases. There is no restriction on the relative amounts of the two isotopes of hydrogen. Natural abundance of deuterium in hydrogen is 0.0156%. The proportion of deuterium could be higher or lower than natural abundance.

The present method is not dependent on any special purity of the reactants. Commercial purity for the reactants is sufficient for the practice of this invention.

The temperature at which the reaction is conducted is from 50° K to 200° and preferably from 77° K to 125° K.

To more fully illustrate the practice of the present invention, the following examples are given. It is understood that these examples are given by way of illustration and are not meant to limit the specification or the claims.

EXAMPLE I

EQUIPMENT

The reactor was a 2-cm-i.d. quartz tube 100 cm long having an inlet and an outlet of a smaller diameter than the tube. The reactor had an outer jacket to allow cooling to liquid nitrogen temperature and had two electrodes. The anode was at the inlet end of the reactor and was a wire extending 10 cm into the jacketed region of the reactor. The outlet of the reactor was attached to a copper tube which served as the cathode. A D.C. discharge was maintained with a variable voltage power supply and a 260Ω resistor in series with the reactor. Attached to the inlet and outlet lines were cold traps cooled to 77° K.

PROCEDURE

Hydrogen and nitrogen in a $H_2/N_2$ mole ratio of 2.6:1 were mixed, were passed through the first cold trap and were introduced into the reactor. The pressure was 3.4 Torr. A D.C. discharge of 32 mA was maintained in the reactor tube. After 16 minutes, the glow discharge and the reactant input stream were turned off and the volume consisting of the reactor, the exit cold trap, and the connecting lines was pumped out. The exit line was then valved off. The cold-trap was cooled to 77° K and the reactor was allowed to warm until all of the reaction products evaporated from the walls. The reaction products were exited from the reactor and were collected at the cold trap.

EXAMPLE II

EQUIPMENT

The same as Example I except that a pulsed discharge was obtained by connecting a 0.1 μ f capacitor in parallel with the reactor in the previously described circuit. The pulsed discharge obtained with this configuration is commonly referred to as a "condensed" discharge.

PROCEDURE

Hydrogen, nitrogen, and helium in a $H_2:N_2:He$ mole ratio of 1.7:1:24 were mixed together, were passed through the first cold trap, and were introduced into the reactor at a pressure of 5.2 Torr. The temperature was again 77° K. A pulsed discharge at 10 pps was used and the time average discharge current was 15 mA. After 60 minutes, the reaction was stopped and the products were collected as before.

EXAMPLE III

EQUIPMENT

The same as Example II.

PROCEDURE

Hydrogen, nitrogen, and helium in a $H_2:N_2:He$ mole ratio of 1:3.1:63 were mixed and were passed through the first cold trap. Xenon was introduced into the feed line after the cold trap in amounts which produced a gas mixture with a $H_2:N_2:He:Xe$ mole trap of 1:3.1:63:31. The process proceeded in the manner described in Examples I and II.

The processing parameters and results of Examples I–III and of two other examples are summarized in Table I.

Table I

| Example | Gas Mixture ($H_2:N_2:He:Xe$) | Total Pressure Torr | Discharge Parameters | Energy Input eV/molecule | Reaction Time/Min | Separation Factor for Ammonia Products = $\frac{(H^1/D)\ products}{(H^1/D)\ reactant}$ |
|---|---|---|---|---|---|---|
| I | 2.65:1:0:0 | 3.4 | 32 mA DC | 5.70 | 16 | 26 ± 9 |
| II | 1.7:1:24:0 | 5.2 | Pulsed, 10 pps 12 mA avg | 0.70 | 60 | 91 ± 37 |
| III | 1:3.1:63:3.1 | 4.8 | Pulsed, 10 pps 15 mA avg | 0.64 | 15 | 51 ± 12 |
| IV | 2.65:1:0:0 | 0.4 | 2 mA DC | 0.23 | 60 | 56 ± 8 |
| V | 1:3.1:252:3.1 | 13 | Pulsed, 10 pps 15 mA avg | 0.16 | 16 | 54 ± 10 |

What is claimed and desired to be secured by Letters Patent of the United States is:

1. A method of separating isotopes of hydrogen which comprises subjecting a mixture of nitrogen and isotopes of hydrogen in a $H_2 - N_2$ mole ratio from 1:4 to 10:1 to a glow electrical discharge from $10^{-3}$ to $10^{+1}$ eV per reactant molecule at a temperature from 50° K to 200° K and at a pressure from about 0.3 Torr to about 25 Torr if said glow electricl discharge is self-sustained or to the condensation pressure of nitrogen if said glow electrical discharge is external.

2. The method of claim 1 wherein a diluent gas which comprises a rare gas or a mixture thereof is included with said mixture of hydrogen isotopes and nitrogen.

3. The method of claim 2 wherein said diluent gas is a noble gas or a mixture thereof.

4. The method of claim 3 wherein said diluent gas is selected from the class consisting of argon, xenon, helium, and mixtures thereof.

5. The method of claim 1 wherein said glow electrical discharge is constant.

6. The method of claim 1 wherein said glow electrical discharge is pulsed.

7. The method of claim 1 wherein said temperature is from 77° K to 125° K.

* * * * *